March 11, 1958     J. NECULA     2,826,229

POTATO CUTTING DEVICE

Filed June 27, 1955

INVENTOR.
Joe Necula
BY

_United States Patent Office_

2,826,229
Patented Mar. 11, 1958

2,826,229

POTATO CUTTING DEVICE

Joe Necula, Omaha, Nebr.

Application June 27, 1955, Serial No. 518,209

5 Claims. (Cl. 146—78)

The present invention relates to devices for cutting potatoes and more particularly to a device for cutting a potato into a plurality of helical strips.

French fried potatoes served in the form of a spiral or a helix have received enthusiastic consumer acceptance. This configuration is appealing to the eye, and as a result, potato spirals have been successfully promoted as a novel food item, particularly by drive-ins, outdoor snack bars and the like. Preparation of potato spirals by hand is a slow, tedious and expensive process.

Accordingly, an object of the present invention is to provide an inexpensive, but highly efficient machine for cutting potatoes into helical strips.

Another object of the present invention is to provide a machine operable for simultaneously cutting a plurality of continuous individual helical strips from each potato processed by the machine.

Yet another object of the present invention is to provide a machine as described above and embodying a power rotated turnplate having a plurality of knives, a cutting blade, a discharge slot extending through the turn plate at the base of the cutting blade, and a plunger for pressing a potato into contact with the knives and cutting blade, the arrangement being such that the knives cut a plurality of laterally spaced-apart grooves in the potato and the blade severs the potato at the bases of the grooves into a plurality of individual helical strips which are discharged through the slot.

A further object of the present invention is to provide a novel and inexpensive arrangement of drive means for rotating the turn plate.

Still a further object of the invention is to provide a safety stop to prevent the plunger from contacting and damaging the knives and blade.

These and other objects and advantages of the invention will be apparent from the following description of one form of the invention, taken with the accompanying drawing wherein.

Figure 1:
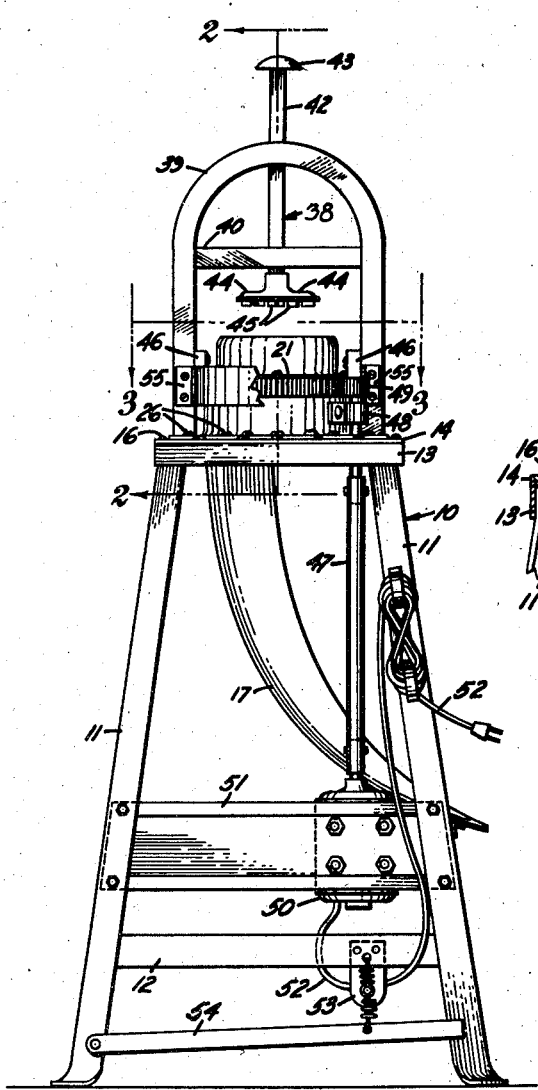
Fig. 1 is a view in side elevation of a machine embodying the present invention and having a portion of the upper structure broken away to more clearly illustrate the invention.

Referring now to the drawing, the preferred embodiment of the invention there illustrated, comprises an upstanding base 10 having four legs 11, two of which are shown. The lower portions of the legs are connected by four cross braces 12, one of which is shown and the top portion of the legs are joined together by cross braces 13, only one of which is shown. The base may be constructed of any suitable material, such as angle irons and may be welded or otherwise secured together by bolts as illustrated.

The angle irons 13 provide a rectangular frame for supporting a connecting member having an outwardly extending flat rectangular flange portion 14 and a central upturned cylindrical flange portion 15. The flange portion 14 may be secured to the angle irons 13 as by bolt 16. The cylindrical flange portion 15 defines a central opening which communicates at its lower end with a discharge chute 17 which is secured to flange portion 14 by bolts 18. Communicating with the upper end of the central opening is a cylindrical casing 19 which is provided with a lower outwardly curved flange 20 which is also connected to the flange 14 by the bolts 18.

Figure 3:
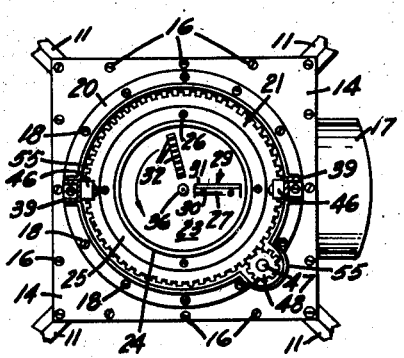
Fig. 3 is an enlarged plan view of the machine taken along line 3—3 of Fig. 1 and illustrating the turn plate in a different position of rotation than as illustrated in Fig. 2.
Figures 4, 5:
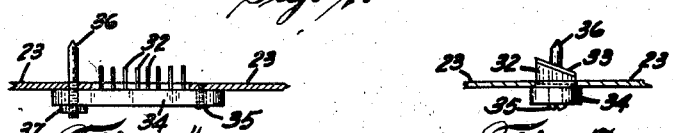
Fig. 4 is an enlarged view in side elevation of only the cutting knives of this invention showing the method of attachment to the turn plate.
Fig. 5 is an end view of the cutting knives and is a right hand view of Fig. 4.
Figure 6:
Fig. 6 is an enlarged view of the plunger head taken along line 6—6 of Fig. 2 showing potato engaging teeth thereon.

The upper edge portions of the casing 19 are smoothed and slightly rounded to provide a bearing for an externally toothed ring gear 21, which is arranged to rotate in a counterclockwise direction as viewed in Fig. 3. The underside of the ring gear is provided with an annular groove 22 which receives the upper edge portions of the casing 19. The sides of the groove cooperate with the bearing edge of the casing to prevent lateral movement of the ring gear with respect to the casing.

The ring gear is arranged for rotation about a substantially vertical axis. Mounted co-axially on the flat upper surface of the gear is a flat, disk-like horizontally disposed turn plate 23. Extending upwardly from the turnplate is a cylindrical retaining wall 24 which is provided with an annular flared flange 25 overlying the edge portions of the turn plate. The retaining wall and turn plate are secured to the gear 21 by a plurality of screws 26 which are received through the flange 25 and the underlying portions of the turn plate.

Figure 2:
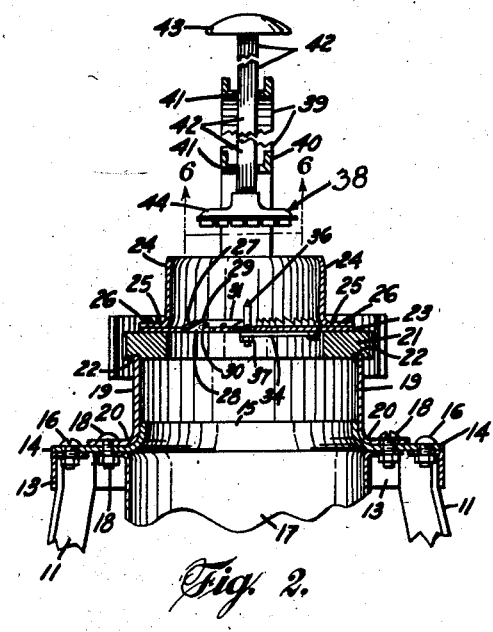
Fig. 2 is an enlarged view of the upper portion of the machine taken in vertical section along line 2—2 of Fig. 1.

As shown in Figs. 2 and 3, a rectangular portion 27 of the turn plate 23 is cut away along three sides and bent upwardly or outwardly from the feed side of the turnplate to form a discharge slot 28. This slot is disposed radially with respect to the axis of rotation of the turn plate and communicates with the lower or discharge side of the turn plate and with the chute 17 through the casing 19. The rectangular portion 27 is provided with a cutting blade 29. This blade may be secured by screws 30 to the underside of the portion 27 so that the cutting edge 31 of the blade extends slightly above the portion 27 and is substantially parallel to the plane of the turn plate 23. The shank of the blade extends from the trailing edge of the slot 28 toward the cutting edge 31 at an angle in the direction of rotation of the turn plate, and operates as a guide for directing severed strips of potato through the discharge slot 28.

Disposed in advance of the cutting blade 29, with respect to the direction of rotation of the turn plate 23 is a radially extending row of knives 32 which are arranged in a side by side and spaced apart relation. The knives extend through a slot in the turn plate 23 and their substantially vertical cutting edges 33 extend upwardly or outwardly from the feed side thereof. The upper extremities of these cutting edges are disposed a slightly greater distance above the feed side of the turn plate 23 than is the cutting edge 31 of the blade 29. Thus, the grooves cut by the knives are slightly deeper than the cutting depth of the blade whereby the knives and blade cooperate to sever a potato into a plurality of individual strips. Also, the upper edge of each knife slopes from the top of the cutting edge downwardly toward the base of the knife so as to provide each knife with as short a length, measured from the leading or cutting edge of the knife to the trailing edge of the knife, as possible. Thus, the broaching action of the knives is reduced to a minimum as the knives are rotated to groove a potato which is pressed onto the feed side of the turn plate as subsequently described. The base portions of the knives are mounted in a bar 34 which is secured at one end to the discharge side of the turn plate by a screw 35. The other end of the bar 34 is secured to the turn plate by a pointed stud 36 which is threadably received through the center of the turn plate 23, the bar 34 being secured to the stud 36 by a nut 37. The arrangement of the knives 32 with respect to blade 29, can best be seen in Fig. 3. Fig. 2 is a view of the knives 32 and blades 29 as they appear when viewed in Fig. 3 from the upper right hand corner of Fig. 3. The knives 32 are spaced approximately 100° from the blade 29 when the angle is measured in the direction of rotation from the blade using the stud 36 as the reference point. This position of the knives with respect to the blade has been found to produce the most desirable results, although the knives may be placed at substantially any point within a 180° arc in advance of the blade 29.

As shown in Fig. 1, a plunger 38 is provided for pressing a potato into contact with the knives 32 and blade 29. A U-shaped bracket 39 having a cross bar 40 is attached at its lower ends to a pair of parallel cross braces 13. As shown in Fig. 2, the upper portion of the bracket 39 and the cross bar 40 are provided with axially aligned rectangular openings 41 which receive the stem 42 of the plunger 38, whereby the plunger 38 is mounted for axial movement toward and away from the turn plate 23 substantially along the axis of rotation thereof. The stem 42 is substantially rectangular in cross section and cooperates with the openings 41 to prevent rotation of the plunger 38. The upper end of the plunger is provided with a hand knob 43 and the lower end of the plunger is provided with a head 44 having radially extending lines of pointed teeth 45 which are adapted to engage a potato and prevent it from rotating as it is being processed. Also, as shown in Fig. 2, the stud 36 extends well above the knives 32 and blade 29 and operates as a stop member, when engaged by the head 44, to prevent the teeth 45 from contacting and damaging the knives and blade.

Finally, the invention comprises power means for rotating the turn plate 23. As shown in Figs. 1 and 3, a pair of diametrically opposed bearing blocks 46 are carried by the opposite arms of the bracket 39. These blocks are disposed with their lower surfaces in close proximity to the upper surface of the ring gear 21, and operate to prevent axial movement of the ring gear. An opening is provided in the flange 14 through which extends a drive shaft 47. The upper end of the drive shaft is received in a bearing 48 and carries a pinion gear 49 which is in mesh with the ring gear 21.

The lower end of the drive shaft 47 is driven by an electric motor 50 which is attached to a bracket 51 of the base 10. The motor 50 may be connected to a source of electrical energy by a conductor cord 52 which includes a toggle switch 53. This toggle switch is normally open and may be closed by depressing the foot lever 54, the left hand end of which is pivotally mounted to the left hand leg 11, and the right hand end of which is bifurcated and is guided by the right hand leg 11, as viewed in Fig. 1. Also, a pair of annular safety guards 55, are arranged around the toothed peripheries of the ring gear and pinion gear. As shown in Figs. 1 and 3, these guards are connected at their end portions to opposite sides of the legs of the bracket 39.

In operation of the potato cutting device, the plunger is raised to the position as shown in Figs. 1 and 2. A potato is then positioned as centrally as possible upon the turn plate 23, and is pressed onto the stud 36 which operates as a skewer and aids in preventing lateral movement of the potato with respect to the turn-plate 23 as the turn-plate is rotated. After the potato has been properly positioned on the turn-plate, the plunger is then moved toward the turn-plate until the teeth 45 in the plunger head 44 engage in the upper free end of the potato. The turn-plate may then be rotated by depressing the foot lever 54 and connecting the motor 50 to a source of electrical energy. As the turn-table 23 rotates in a counter-clock-wise direction, as viewed in Fig. 3, the knives 32 cut a plurality of spaced grooves in the underside of the potato, and the blade cutting edge 31 severs the potato at the bases of the grooves and into a plurality of continuous helical strips. As the cutting edge 31 severs the potato, the plurality of helical strips are guided by the shank portion of the blade into and through the discharge slot 28 whereby the potato spirals slide down the chute 17 and are received in any suitable container positioned thereunder.

The grooving and severing operations continue as the plunger is moved toward the turn plate to press the potato into engagement with the knives and blade, and until the top of the stud 36 is engaged by the underside of the head 44 to limit the downward movement thereof.

Thus, it may be seen that the device of the present invention operates to cut a potato into a plurality of helical strips or spirals. Each spiral being severed from the potato by the cutting edge 31, and thereafter being forwarded through the discharge slot 28 as a continuous spiral strip of potato until the downward motion of the plunger is stopped by engagement with the upstanding stud member 36.

The casing portions of the machine may be inexpensively constructed from any suitable material such as stainless steel or the like. The drive means and gearing arrangement, provided for rotating the turn plate, may be produced inexpensively, and may be easily assembled without the use of expensive ball bearings and the like. This type of structure is sufficient in the present invention, since the machine need only run periodically at brief intervals to produce a large volume of spiralled potatoes. The inexpensive and rugged construction of this machine and the volume of output have resulted in substantial savings in money and time for a great number of drive-in and outdoor snack bar operators.

The foregoing description has been given for clarity in understanding only and no unnecessary limitation should be implied therefrom, for it will be apparent to those skilled in the art that variations and changes may be made in the present invention without departing from the spirit and scope of the appended claims.

What is claimed is:

1. A potato cutting device comprising; a frame, a turn plate having a substantially planar upwardly facing feed side and a discharge side and rotatably mounted on said frame for rotation about an axis substantially normal to the plane of the feed side of said plate, said plate having a discharge slot extending therethrough from said feed side to said discharge side and disposed radially with respect to said axis of rotation, a cutting blade attached to said turn plate adjacent to the trailing edge of said slot and having a cutting edge spaced outwardly from the feed side of said plate, a set of knives disposed in a spaced apart side by side relation and mounted on said turn plate and extending outwardly from the feed side thereof, said knives being spaced apart progressively greater distances respectively with respect to said axis of rotation and disposed in advance of said cutting blade with respect to the direction of rotation of said turn plate, the space between said knives and said blade being open, and said knives remaining in positions projecting outwardly from said turnplate and cutting continuously during operation, an upwardly opening potato retaining wall surrounding and projecting upwardly from the upper side of said turnplate, means mounting said retaining wall on said machine, an elongated plunger disposed on the feed side of said turnplate for pressing a potato into contact with said knives and said blade, projections extending from the turnplate end of said plunger for engaging a potato and adapted to be forced into a potato for preventing said potato from rotating independently of said plunger, means movably mounting said plunger on said frame in a manner permitting longitudinal movement of said plunger but preventing rotation of said plunger with respect to said frame, said plunger mounting means and said plunger being so constructed that the turnplate end of said plunger can be retracted a sufficient distance above said retaining wall to permit potatoes to be inserted through the upper end of said retaining wall, and power driven means drivably connected to said turnplate for rotating said turn plate.

2. A potato cutting device comprising; a frame, a turn plate having a substantially planar upwardly facing feed side and a discharge side and rotatably mounted on said frame for rotation about an axis substantially normal to the plane of the feed side of said plate, said plate having a discharge slot extending therethrough from said feed side to said discharge side and disposed radially with respect to said axis of rotation, a cutting blade attached to said turn plate adjacent to the trailing edge of said slot and having a cutting edge spaced outwardly from the feed side of said plate, a set of knives disposed in a spaced apart side by side relation and mounted on said turn plate and extending outwardly from the feed side thereof, said knives being spaced apart progressively greater distances respectively with respect to said axis of rotation and disposed in advance of said cutting blade with respect to the direction of rotation of said turn plate, the space between said knives and said blade being open, and said knives remaining in positions projecting outwardly from said turnplate and cutting continuously during operation, an elongated plunger disposed on the feed side of said turn plate for pressing a potato into contact with said knives and said blade, projections extending from the turn plate end of said plunger for engaging a potato and adapted to be forced into a potato for preventing said potato from rotating independently of said plunger, means movably mounting said plunger on said frame in a manner permitting longitudinal movement of said plunger but preventing rotation of said plunger with respect to said frame, and power driven means drivably connected to said turnplate for rotating said turn plate.

3. A potato cutting device comprising; a frame, a turn plate having a substantially planar upwardly facing feed side and a discharge side and rotatably mounted on said frame for rotation about an axis substantially normal to the plane of the feed side of said plate, said plate having a discharge slot extending therethrough from said feed side to said discharge side and disposed radially with respect to said axis of rotation, a cutting blade attached to said turn plate adjacent to the trailing edge of said slot and having a cutting edge spaced outwardly from the feed side of said plate, a set of knives disposed in a spaced apart side by side relation and mounted on said turn plate and extending outwardly from the feed side thereof, said knives being spaced apart progressively greater distances respectively with respect to said axis of rotation and disposed in advance of said cutting blade with respect to the direction of rotation of said turn plate, the space between said knives and said blade being open, and said knives remaining in positions projecting outwardly from said turnplate and cutting continuously during operation, an elongated plunger disposed on the feed side of said turn plate for pressing a potato into contact with said knives and said blade, projections extending from the turn plate end of said plunger for engaging a potato and adapted to be forced into a potato for preventing said potato from rotating independently of said plunger, means movably mounting said plunger on said frame in a manner permitting longitudinal movement of said plunger but preventing rotation of said plunger with respect to said frame, and power driven means drivably connected to said turnplate for rotating said turn plate, an elongated spear fixed to and projecting vertically upwardly from the center of rotation of said turn plate to receive a potato thereon to make possible a rapid manual alignment of the potato and to hold lopsided potatoes from tipping over into undesired positions prior to the descent of said plunger, said spear serving as a stop means and being of a length greater than said potato rotation preventing projections on said plunger and greater than the projecting portions of said knives and of said blade to prevent contact between said projections and said knives and blade.

4. A potato cutting device comprising; a frame, a turn plate having a substantially planar upwardly facing feed side and a discharge side and rotatably mounted on said frame for rotation about an axis substantially normal to the plane of the feed side of said plate, said plate having a discharge slot extending therethrough from said feed side to said discharge side and disposed radially with respect to said axis of rotation, a cutting blade attached to said turn plate adjacent to the trailing edge of said slot and having a cutting edge spaced outwardly from the feed side of said plate, a set of knives disposed in a spaced apart side by side relation and mounted on said turn plate and extending outwardly from the feed side thereof, said knives being spaced apart progressively greater distances respectively with respect to said axis of rotation and disposed in advance of said cutting blade with respect to the direction of rotation of said turn plate, the space between said knives and said blade being open, and said knives remaining in positions projecting outwardly from said turnplate and cutting continuously during operation, an elongated plunger disposed on the feed side of said turn plate for pressing a potato into contact with said knives and said blade, projections extending from the turn plate end of said plunger for engaging a potato and adapted to be forced into a potato for preventing said potato from rotating independently of said plunger, means movably mounting said plunger on said frame in a manner permitting longitudinal movement of said plunger for preventing rotation of said plunger with respect to said frame, and an externally toothed ring gear attached to said turnplate and rotating therewith, and power driven means for driving said ring gear.

5. The cutter of claim 2 having a vertically elongated longitudinally curved discharge chute attached to said frame and extending downwardly from the underside of said turnplate, said curvature being sufficiently gradual as to avoid breakage of fragile shoe-string potato spirals.

References Cited in the file of this patent
UNITED STATES PATENTS

| | | |
|---|---|---|
| 100,049 | Lutz et al. | Feb. 22, 1870 |
| 1,619,746 | Miller | Mar. 1, 1927 |
| 2,715,927 | Cupper et al. | Aug. 23, 1955 |